United States Patent
Kitazawa

(10) Patent No.: US 6,788,289 B2
(45) Date of Patent: Sep. 7, 2004

(54) SYSTEM AND METHOD OF POINTED POSITION DETECTION SYSTEM, PROJECTOR AND PROGRAM

(75) Inventor: Takayuki Kitazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 174 days.

(21) Appl. No.: 09/778,740

(22) Filed: Feb. 8, 2001

(65) Prior Publication Data

US 2001/0028341 A1 Oct. 11, 2001

(30) Foreign Application Priority Data

Feb. 8, 2000 (JP) ........................................ 2000-030710

(51) Int. Cl.⁷ ............................ G09G 5/00; G06F 3/033
(52) U.S. Cl. ...................................... 345/158; 345/156
(58) Field of Search ................................ 345/156–158; G09G 5/00; G06F 8/033

(56) References Cited

U.S. PATENT DOCUMENTS

| | | | | |
|---|---|---|---|---|
| 5,528,263 A | * | 6/1996 | Platzker et al. | 345/156 |
| 5,572,251 A | * | 11/1996 | Ogawa | 348/207.99 |
| 6,188,802 B1 | * | 2/2001 | Usuda et al. | 382/295 |
| 6,275,214 B1 | * | 8/2001 | Hansen | 345/158 |
| 6,323,839 B1 | * | 11/2001 | Fukuda et al. | 345/157 |

FOREIGN PATENT DOCUMENTS

| | | | |
|---|---|---|---|
| JP | 08-095707 | 4/1996 | |
| JP | 08-320921 | 12/1996 | |
| JP | 08-080372 | * 3/1997 | ............ G02F/1/13 |
| JP | A 9-512656 | 12/1997 | |
| JP | 11-024839 | 1/1999 | |
| JP | 11-039095 | 2/1999 | |
| JP | 11-057216 | 3/1999 | |
| JP | 11-085395 | 3/1999 | |
| JP | 11-345085 | 12/1999 | |
| WO | WO 95/34881 | 12/1995 | |

* cited by examiner

Primary Examiner—Alexander Eisen
(74) Attorney, Agent, or Firm—Oliff & Berridge, PLC

(57) ABSTRACT

A pointed position detection system and method, a presentation system, and an information storage medium that enable the creation of a suitable differential image even when a pointing action is halted. An image of an image display region in which is displayed an uniform image with no pointing image is picked up as an image for differential image generation. The system is provided with a CCD camera that picks up an image of this image display region in which a pointing action is peformed as a pointing image, and a position detection processing section that extracts a differential image based on the image for differential image generation and the pointing image then detects the pointed position in the pointing image that is comprised within the image display region based on the differential image, so that the detection of the pointed position is based on the differential image.

22 Claims, 14 Drawing Sheets

SYSTEM AND METHOD OF POINTED POSITION DETECTION SYSTEM, PROJECTOR AND PROGRAM

BACKGROUND OF THE INVENTION

1. Field of the Invention

The present invention relates to a system and method of pointed position detection that use a differential image, a presentation system and a program.

2. Description of Related Art

It is already known in the art to use a CCD camera to acquire an image display region in which a pointing action is implemented, during a presentation, and detect the pointed position.

There are serious problems concerning how the position is to be detected in such a case.

In one method that has been proposed for detecting such a position, differential images of a plurality of frames are extracted in sequence, and the tip of the pointed position is detected.

Since it is not possible with this method to extract a differential image accurately when the pointing action is halted, however, it can be difficult to detect the pointed position.

SUMMARY OF THE INVENTION

The present invention was devised in the light of the above described technical problem and has as an objective thereof the provision of a pointed position detection system and method, a system, a projector and a program that make it possible to create a suitable differential image, even when the pointing action is in a halted state, when using such a differential image.

(1) According to a first aspect of the present invention, there is provided a pointed position detection system which detects a position pointed by a pointer within a predetermined image display region, the system comprising:

image pick-up means for picking up an image of the image display region;

means for storing an image for differential image generation which is generated by picking up an image of the image display region on which a uniform image is displayed;

differential image extraction means for extracting a differential image based on the image for differential image generation and a pointing image which is generated by picking up an image of the image display region in which a pointing action is performed; and means for detecting a pointed position in the pointing image comprised within the image display region, based on the extracted differential image.

(2) According to a second aspect of the present invention, there is provided a pointed position detection system which detects a position pointed by a pointer within a predetermined image display region, the system comprising:

image pick-up section for picking up an image of the image display region;

section for storing an image for differential image generation which is generated by picking up an image of the image display region on which a uniform image is displayed;

differential image extraction section for extracting a differential image based on the image for differential image generation and a pointing image which is generated by picking up an image of the image display region in which a pointing action is performed; and section for detecting a pointed position in the pointing image comprised within the image display region, based on the extracted differential image.

(3) According to a third aspect of the present invention, there is provided a computer-usable program embodied on an information storage medium or in a carrier wave for implementing a presentation system that detects a pointed position in a predetermined image display region, the program implementing in a computer:

means for storing an image for differential image generation which is generated by picking up an image of the image display region on which is displayed a uniform image by means of image pick-up means;

differential image extraction means for extracting a differential image based on the image for differential image generation and a pointing image which is generated by picking up an image of the image display region in which a pointing action is performed; and means for detecting a pointed position in the pointing image comprised within the image display region, based on the extracted differential image.

(4) According to a fourth aspect of the present invention, there is provided a pointed position detection method of detecting a position pointed in a predetermined image display region, the method comprising the steps of:

storing an image for differential image generation which is generated by picking up an image of the image display region on which is displayed a uniform image;

extracting a differential image based on the image for differential image generation and a pointing image which is generated by picking up an image of the image display region in which a pointing action is performed; and detecting a pointed position in the pointing image comprised within the image display region, based on the extracted differential image.

This aspect of the invention makes it possible to create a suitable differential image in which is reflected the pointed position when the pointing action is in a halted state, by obtaining a difference between a uniform image and an image in which the pointing action is performed, thus making it possible to accurately detect the pointed position.

(5) The image for differential image generation and the pointing image may be generated by picking up an image formed by invisible rays.

This makes it possible to perform image processing based on a suitable image that is not greatly affected by the light projected into the image display region during the processing of the image, by applying an image that was formed by invisible rays, thus increasing the accuracy with which the pointed position is detected.

(6) The invisible rays may be infrared rays; and the image pick-up means may pick up an image formed by infrared rays, through an infrared transmission section that allows only infrared rays to pass.

This eliminates unwanted light components by taking an image formed by infrared rays through the infrared-transmission section. As a result, accurate position detection is achieved by a reduction in the noise generated by changes in the unwanted light components.

Note that the infrared rays in this case are generally electromagnetic waves of wavelengths of 700 nm to 1 mm.

(7) The pointed position detection system may further comprise an auxiliary light source which projects infrared rays toward the image display region when picking up an image formed by infrared rays.

This provision of an auxiliary light source ensures that infrared rays can be provided for the pickup of the image, even when the system is used in a location without sunlight.

(8) The pointed position detection system may further comprise:

image display means for displaying an image in the image display region; and control means for determining whether or not update of the image for differential image generation is necessary, based on the differential image which has been extracted based on the image for differential image generation and a non-pointing image generated by picking up an image of the image display region in which no pointing action is performed, and controlling the image display means to display the uniform image for a predetermined short period of time and also controlling the image pick-up means to pick up an image of the image display region in which the uniform image is displayed and thus capture a new image for differential image generation, when the update is necessary.

(9) The program may further implement in a computer, control means for determining whether or not update of the image for differential image generation is necessary, based on the differential image which has been extracted based on the image for differential image generation and a non-pointing image generated by picking up an image of the image display region in which no pointing action is performed, and controlling image display means which displays an image in the image display region to display the uniform image for a predetermined short period of time and also controlling the image pick-up means to pick up an image of the image display region in which the uniform image is displayed and thus capture a new image for differential image generation, when the update is necessary.

(10) In the pointed position detection method, the step of extracting a differential image may include:

a step of extracting a differential image based on the image for differential image generation and a non-pointing image generated by picking up an image of the image display region in which no pointing action is performed;

a step of determining whether or not update of the image for differential image generation is necessary based on the extracted differential image;

a step of displaying the uniform image for a predetermined short period of time when the update is necessary; and a step of picking up an image of the image display region in which the uniform image is displayed to capture a new image for differential image generation.

This makes it possible to re-capture an image for differential image generation whenever necessary, to replace it with the previously stored image for differential image generation. Even when noise such as extraneous light such as daylight increases, such noise components can be eliminated by the image for differential image generation, thus enabling accurate detection of the pointed position in answer to changes in the environment.

Note that since the uniform image is displayed for only an instant, it is possible to re-create the image for differential image generation without imparting any sort of unpleasant visual feeling to people viewing that image.

(11) The pointed position detection system may further comprise:

image display means for displaying an image within the image display region; and control means for controlling the image display means to display the uniform image for a predetermined short period of time at a predetermined temporal spacing, and also controlling the image pick-up means to pick up an image of the image display region in which the uniform image is displayed and thus capture a new image for differential image generation.

(12) The program may further implement in a computer, control means for controlling image display means which displays an image in the image display region to display the uniform image for a predetermined short period of time at a predetermined temporal spacing, and also controlling the image pick-up means to pick up an image of the image display region in which the uniform image is displayed and thus capture a new image for differential image generation.

(13) The pointed position detection method may further comprise:

a step of displaying the uniform image for a predetermined short period of time at a predetermined temporal spacing; and a step of picking up an image of the image display region in which the uniform image is displayed to capture a new image for differential image generation.

This ensures that a differential image is always created to suit the current environment, thus enabling accurate position detection, by re-creating the image for differential image generation at regular intervals and replacing it with the previous image for differential image generation.

Note that since the uniform image is displayed for only an instant, it is possible to re-create the image for differential image generation without imparting any sort of unpleasant feeling to people viewing that image.

(14) The control means may control the image display means to display a predetermined image for calibration during a calibration step, to obtain correspondence between the image display region and an image processing region.

This ensures accurate pointed position detection by obtaining correspondence between the image display region and the image processing region, based on the result of pickup of an image for calibration purposes, by way of example.

Note that the image for calibration in this case is preferably an image in which is disposed a plurality of points at positions that are a predetermined distance from a central position of the image.

(15) According to a fifth aspect of the present invention, there is provided a presentation system which comprises processing means that performs predetermined data processing which reflects a pointed position detected by the above-described pointed position detection system.

The program may further implement in a computer, processing means that performs predetermined data processing which reflects a pointed position detected by the above-described means.

This makes it possible to perform various types of processing based on position detection.

In this case, this data processing could be calculations of the display position of a cursor, changes in the display of the cursor, icon pointing determination, or icon display modification, by way of example.

(16) The processing means may perform positional control of a cursor comprised within a display image, based on the detected pointed position.

This enables control of the position at which a cursor is displayed, according to the pointed position. Since this makes it possible for a cursor to follow the pointed position accurately during a presentation or the like, with no false recognition caused by extraneous light, it is possible to produce effective presentations.

DETAILED DESCRIPTION OF THE PREFERRED EMBODIMENT

Figure 1:
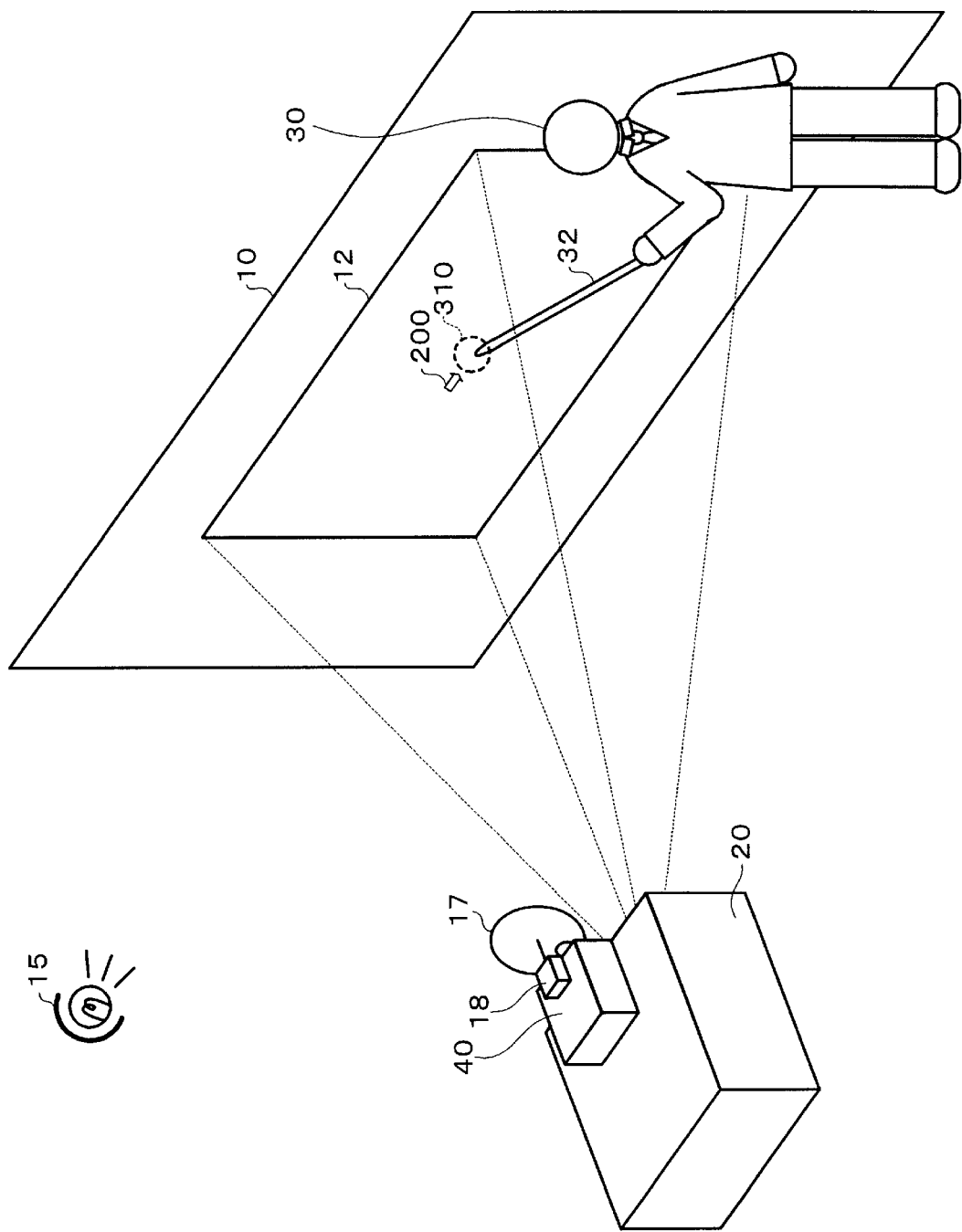
FIG. 1 is a schematic view of a presentation system of a typical embodiment of the present invention.

A preferred embodiment of a presentation system to which the present invention is applied will now be described, with reference to the accompanying figures.
Description of Overall System An example of a presentation system that uses a front-projection type of device as an image display device is shown in FIG. 1.

An image for a predetermined presentation is projected from a projector 20 that is provided substantially facing a screen 10 which acts as a projection screen, towards the screen 10. A image display region 12 is defined by the projection of this image onto a display image region. A presenter 30 gives a presentation to an audience while indicating desired positions of the image of the image display region 12, using a pointer rod 32 or the like.

This image display region 12 of the screen 10 is also acquired by using a CCD camera 40, which is an imaging means provided substantially facing the screen 10, as shown in FIG. 1.

Figure 2A:
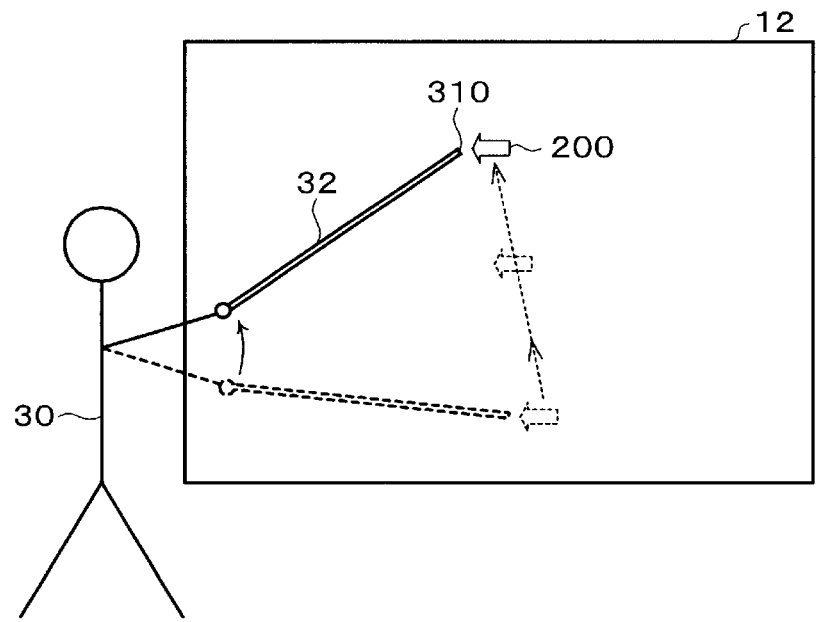
FIG. 2A is illustrative of the presentation operation and FIG. 2B is illustrative of an acquired image during that time.
Figure 2B:
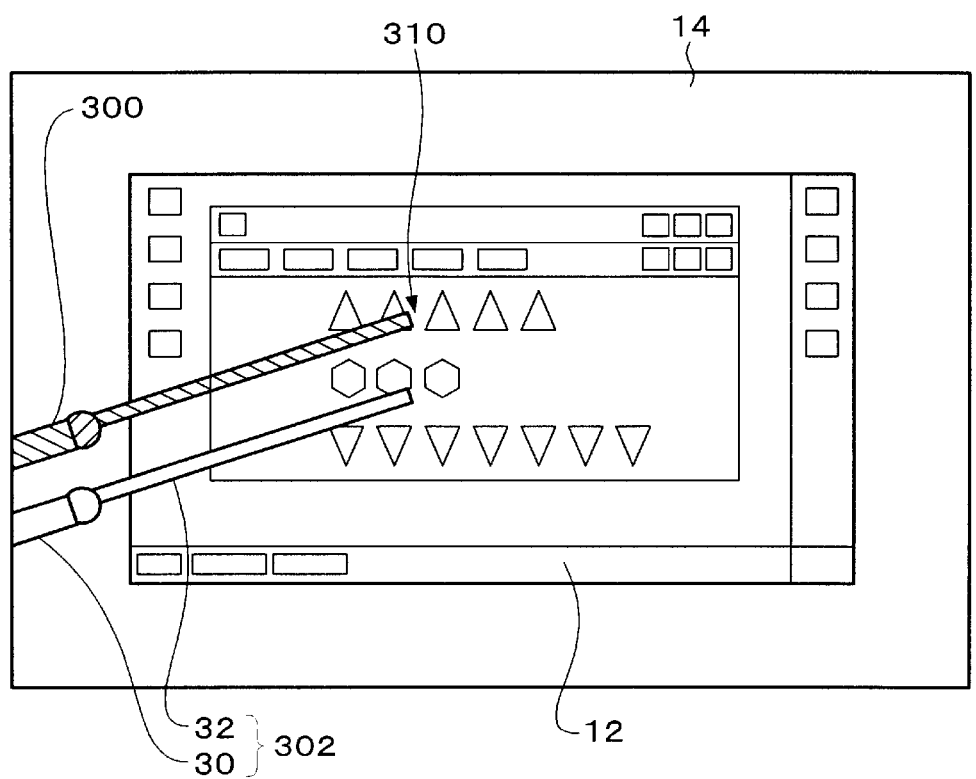

An example of a acquired image 14 that is taken by the CCD camera 40 is shown in FIG. 2B. As shown in this figure, the imaged region of the acquired image 14 is positioned at substantially the center of the image display region 12 and is disposed to cover a slightly wider range than that of the image display region 12.

The description now turns to the process of detecting a pointed position, when the presenter gives the presentation while using a pointer image such as that of the pointer rod 32 or a finger.

The presenter 30 gives the presentation while using the pointer rod 32 to indicate a desired pointed position 310 on the image display region 12 of the projected image, as shown in FIG. 2A.

This situation is acquired by the CCD camera 40. The example of the thus captured image 14 shown in FIG. 2B comprises part of the presenter 30 together with a shadow 300 and an actual image 302 formed by the pointer rod 32, etc.

A long, thin, rod-shaped shadow that is cast by the pointer rod 32 and other parts within the light that is projected from the projector 20 into the captured image 14 is called a shadow region 300 of the pointer image. The actual image of the pointer rod 32 that appears within the captured image 14 is called the actual image region 302 which is the object of detection within information that is used for the detection region of the pointed position 310.

The description of this embodiment of the present invention takes the detection of this shadow region 300 by way of example.

The pointed position 310 that is indicated by the presenter 30, using the shadow region 300 of the pointer rod 32 and other parts, is detected as the tip position of the shadow region 300 of the rod-shaped pointer image comprised within the captured image 14. In other words, the tip position of the shadow region 300 of the rod-shaped pointer image is detected automatically as the pointed position 310.

Predetermined data processing is based on this detection result. An example of such data processing is cursor control. If the presenter 30 of FIG. 2A uses the pointer rod 32 to indicate a desired position in the image display region 12, by way of example, a cursor 200 that is comprised within the display image of the image display region 12 can be made to follow the pointed position 310 of the pointer rod 32.

Figure 3:
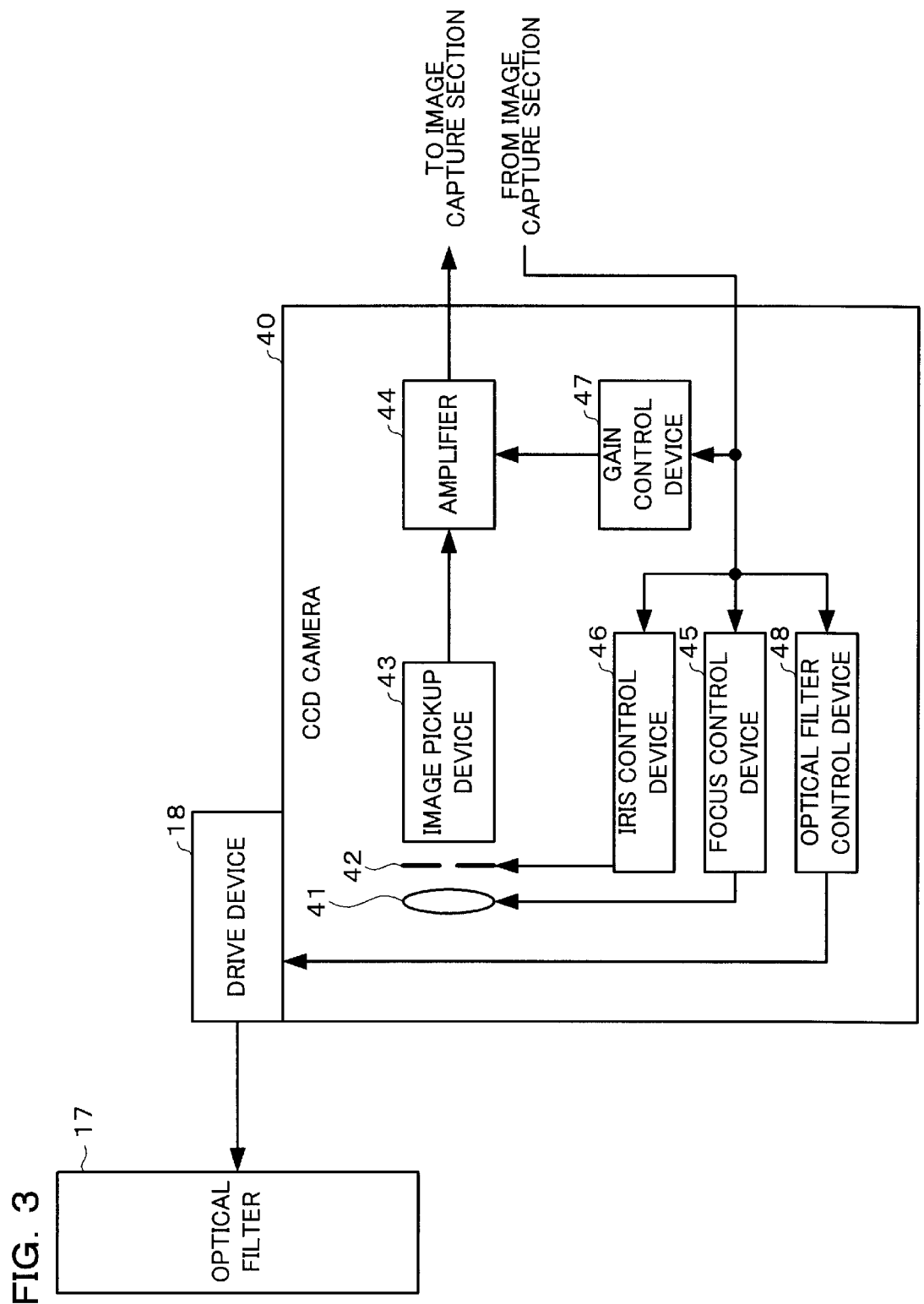
FIG. 3 is a schematic view of a CCD camera in accordance with this typical embodiment of the present invention.

A schematic view of the CCD camera 40 is shown in FIG. 3.

The CCD camera 40 of this embodiment of the present invention comprises a lens 41, an iris 42, and a CCD image pickup device 43 for image acquisition. An image signal acquired by the image pickup device 43 is output to an image capture section 72 through an amplifier 44.

An optical filter 17 is provided on the front surface of the lens 41 and a drive device 18 that drives the optical filter 17 in rotation is mounted on the top surface of the CCD camera 40.

The CCD camera 40 of this embodiment of the present invention comprises a focus control device 45, an iris control device 46, a gain control device 47, and an optical filter control device 48 that are controlled on the basis of control signals from the image capture section 72, which will be described later. The focus control device 45 controls the focusing of the lens 41, the iris control device 46 controls the aperture of the iris 42, the gain control device 47 adjusts the gain of the amplifier 44, and the optical filter control device 48 controls the driving of the drive device 18.

Figure 4:
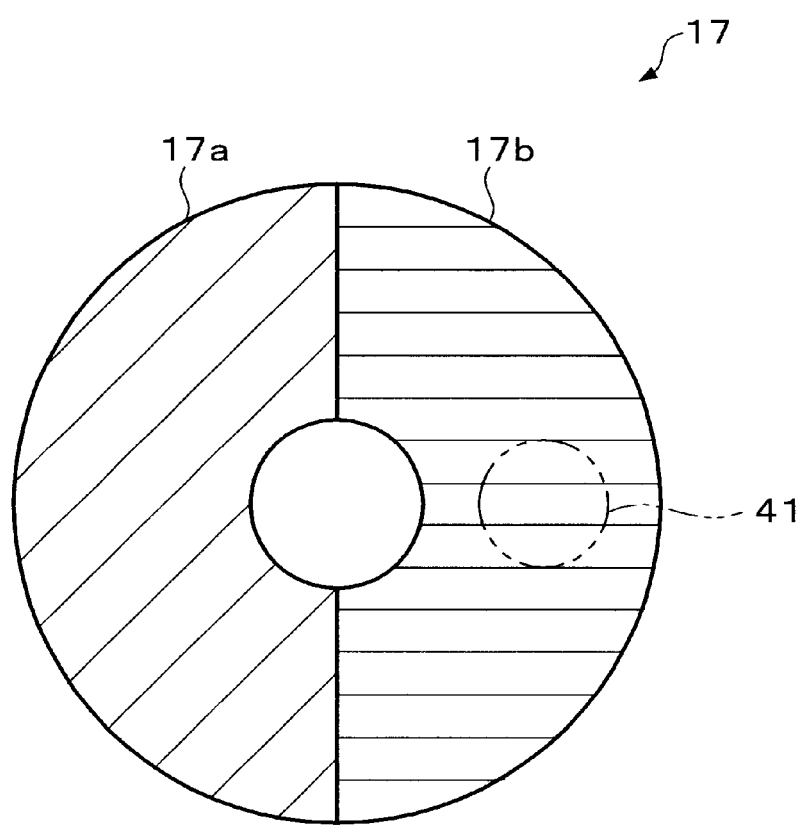
FIG. 4 is a schematic front view of an optical filter in accordance with this typical embodiment of the present invention.

A schematic front view of the optical filter 17 in accordance with an example of this embodiment of the present invention is shown in FIG. 4.

The optical filter 17 is formed in a circular shape where half of the circle is an optical filter 17a, which is an infrared-transmission section that passes only infrared light, and the other half is an optical filter 17b which passes only visible light.

With this embodiment of the invention, an image is taken through the optical filter 17a during the process of capturing an image for creating the differential image, as will be described later. In other words, the image in this case is formed by infrared rays that are one example of invisible rays, through the lens 41 of the CCD camera 40.

Note that the infrared rays in this case are generally electromagnetic waves of wavelengths of 700 nm to 1 mm.

A light source 15 that is a source of infrared rays is provided, as shown in FIG. 1. This ensures that suitable infrared rays can be provided even in locations where there is no infrared rays, such as places where sunlight does not shine.

The description now turns to the processing section that performs image processing and position detection.

Figure 5:
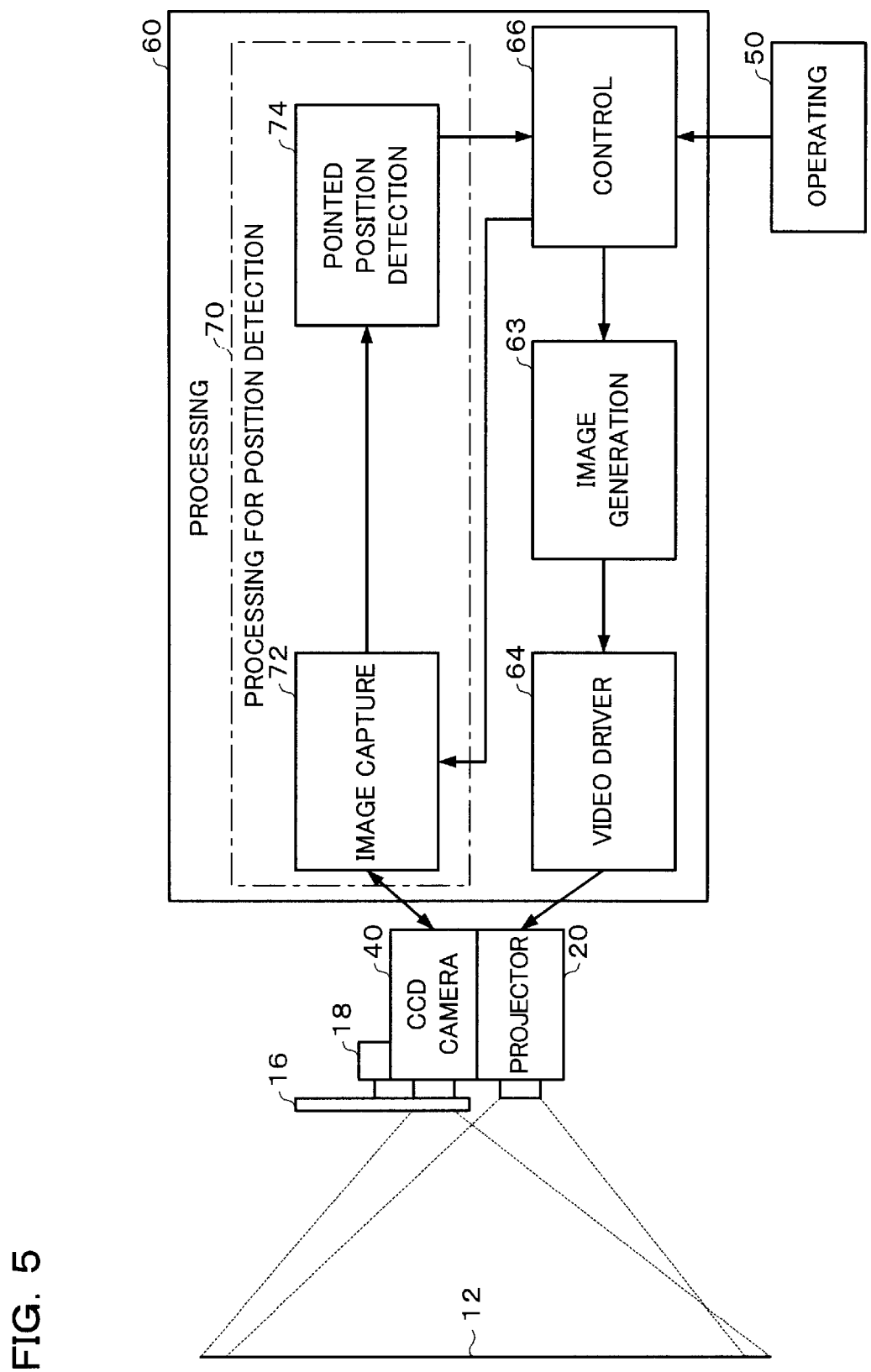
FIG. 5 is a functional block diagram of a processing section in accordance with this typical embodiment of the present invention.

A functional block diagram of a processing section 60 in accordance with an example of this embodiment of the invention is shown in FIG. 5.

The processing section 60 comprises a image generation section 63, which generates an image signal for the presentation, and a video driver 64, which supplies the generated image signal to the projector 20, adjusts the light levels in accordance with this image signal, and forms the image display region 12 from this adjusted light, to be projected onto the screen.

In addition, the processing section 60 comprises a processing section 70 for position detection, which automatically detects the pointed position within the image display region 12 from the image acquired by the CCD camera 40, and a control section 66, which performs various tasks such as controlling the movement of the cursor 200 so that the cursor 200 indicates the thus-recognized pointed position comprised within the image projected from the projector 20.

The control section 66 supplies a position control signal for the cursor 200 to the image generation section 63, based on the thus-recognized pointed position, and the image generation section 63 performs processing to display the cursor 200 at the position indicated by the control section 66.

The thus configured processing section 60 is implemented by using components such as a CPU, a ROM that is an information storage medium for storing various programs and data, and a RAM that functions as a work area.

Pointed Position Detection

The description now turns to details of the processing section 70 for position detection.

The processing section 70 for position detection performs processing to detect the tip position of the rod-shaped shadow region 300, which is comprised within the captured image 14 of the CCD camera 40 as the pointer image, as the pointed position 310 within the image display region 12.

To perform this detection processing, the processing section 70 for position detection is provided with the image capture section 72, which captures the captured image 14 of the CCD camera 40, and a pointed position detection section 74, which detects the pointed position 310 from the captured image data.

The image capture section 72 controls the CCD camera 40 on the basis of detection condition data that is stored in a predetermined condition storage section, and also sets a reference value for position detection.

More specifically, it stores the optimal iris and gain settings to enable the CCD camera 40 to extract the shadow region 300 of the pointer image of the pointer rod 32 and other parts.

During the automatic detection of the pointed position from the shadow region 300 of the pointer image of the pointer rod 32 and other parts, the image capture section 72 adjusts the CCD camera 40 on the basis of the detection conditions stored in the condition storage section, and captures the captured image 14 of the CCD camera 40.

The pointed position detection section 74 performs processing to extract a differential image from the captured image data. More specifically, the pointed position detection section 74 extracts a differential image based on an image for differential image generation obtained by having the CCD camera 40 take an image of the image display region 12 when a uniform image in which no pointing action is performed is displayed, and a pointing image obtained by having the CCD camera 40 take an image of the image display region 12 when a pointing action is performed.

The pointed position detection section 74 detects the tip position of the thus-extracted differential image as the pointed position 310 and outputs this detected data to the control section 66.

Figure 6:
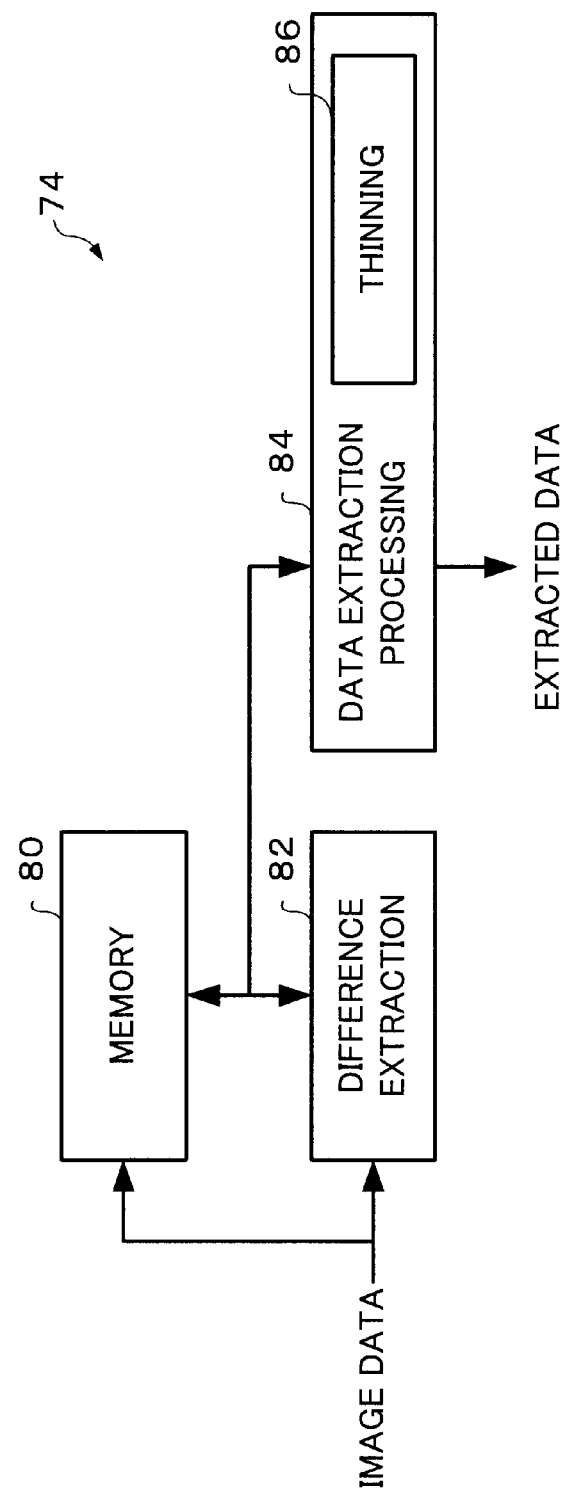
FIG. 6 is a detailed functional block diagram of a position detection section in accordance with this typical embodiment of the present invention.

A more detailed functional block diagram of this pointed position detection section 74 is shown in FIG. 6.

The pointed position detection section 74 of this embodiment of the invention is configured to function as a memory 80, a difference extraction section 82, and a data extraction processing section 84.

The memory 80 contains a number of frames of the acquired image that is captured by the image capture section 72, and is updated every time new acquired image data is input. This ensures that several frames of the most recent acquired images are always available.

The operation of writing and updating the data in the memory 80 is done by the pointed position detection section 74 which functions as an update control means.

One characteristic of this embodiment of the invention lies in the way that a differential image of the image for differential image generation and the pointing image is extracted once every several frames, preferably once every frame, and the detection of the pointed position 310 is carried out on the thus-extracted differential image.

The description now turns to the process of creating this differential image.

Figure 7A:
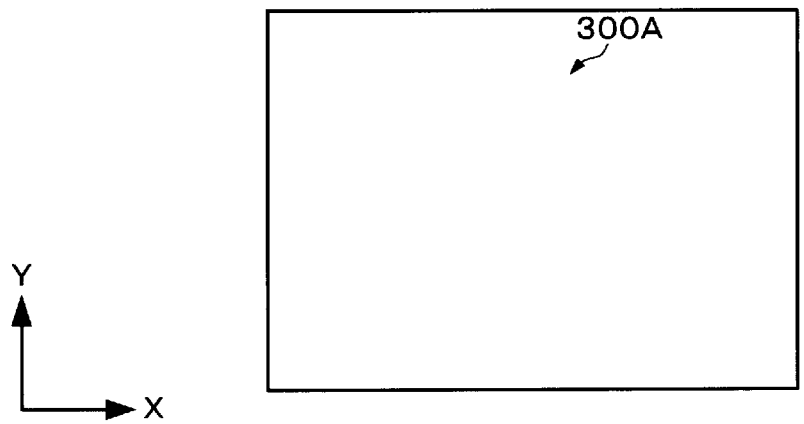
FIG. 7A shows an image for differential image generation.
Figure 7B:
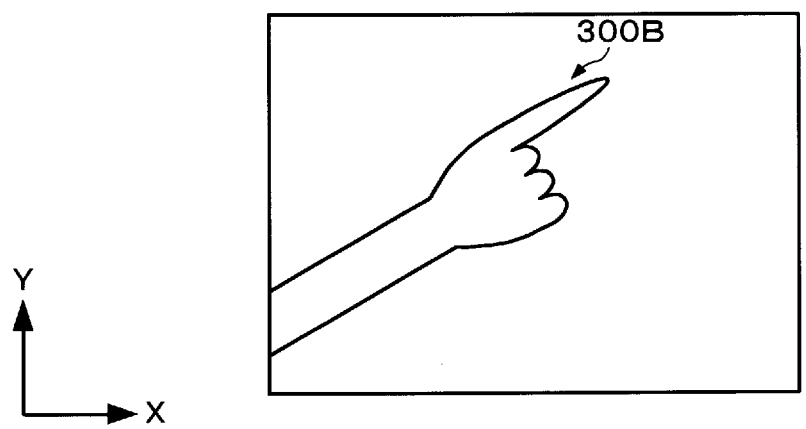
FIG. 7B shows a pointing image.
Figure 7C:
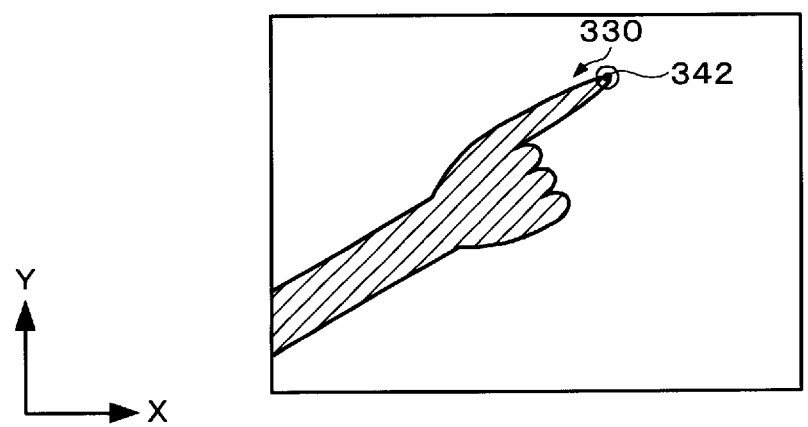
FIG. 7C shows a differential image.

An image for differential image generation is shown in FIG. 7A. a pointing image is shown in FIG. 7B, and a differential image is shown in FIG. 7C.

FIG. 7A shows a region 300A that is comprised within an image taken when no pointing action is performed, and FIG. 7B shows a region 300B that is comprised in the acquired image of the current frame. With this system, an image for differential image generation is created as a reference image by capturing the region 300A and the pointing image is created by capturing the region 300B.

The difference extraction section 82 extracts a differential image 330 of the regions 300A and 3003. based on the image for differential image generation and the pointing image. In other words, it extracts the differential image 330 by excluding portions that are common to the two images.

Since the thus-extracted differential image 330 enables the removal of interference such as noise, in comparison with a method in which an independent pointing image is used alone, it makes it possible to provide accurate pointed position detection with little interference from ambient light or noise within the pictures.

The employment of a method of extracting the differential image 330 from the image for differential image generation and the pointing image in a non-moving state makes it possible to create the differential image 330 even when the pointing action is halted. Since this makes it possible to extract the differential image 330 accurately, without being greatly affected by changes such as the surrounding environment or pointer movements, the pointed position 310 can be detected accurately from a tip position 342 of the differential image 330.

Note that this system also performs processing to extract the shadow region 300 and detect inclinations for detecting direction vectors of the differential image 330 that indicate the pointing direction in four directions. Furthermore, this system performs processing to specify the tip position 342 of the differential image 330 accurately, then it uses a thinning section 86 to perform thinning on the differential image 330 in order to detect the pointed position.

This makes it possible to detect the direction and tip position of the differential image 330 even more accurately, thus enabling more accurate pointed position detection.

Note that further details such as those of inclination detection processing and the detailed processing are disclosed in the patent literature (Japanese Patent Application No. 11-176397) by the present applicants, so further description thereof is omitted.

The capturing of the image for differential image generation (reference image) is done during calibration.

The description now turns to the image that is projected during calibration. A uniform white pattern image is shown in FIG. 8A and a pattern image for position calibration is shown in FIG. 8B.

Figure 8A:
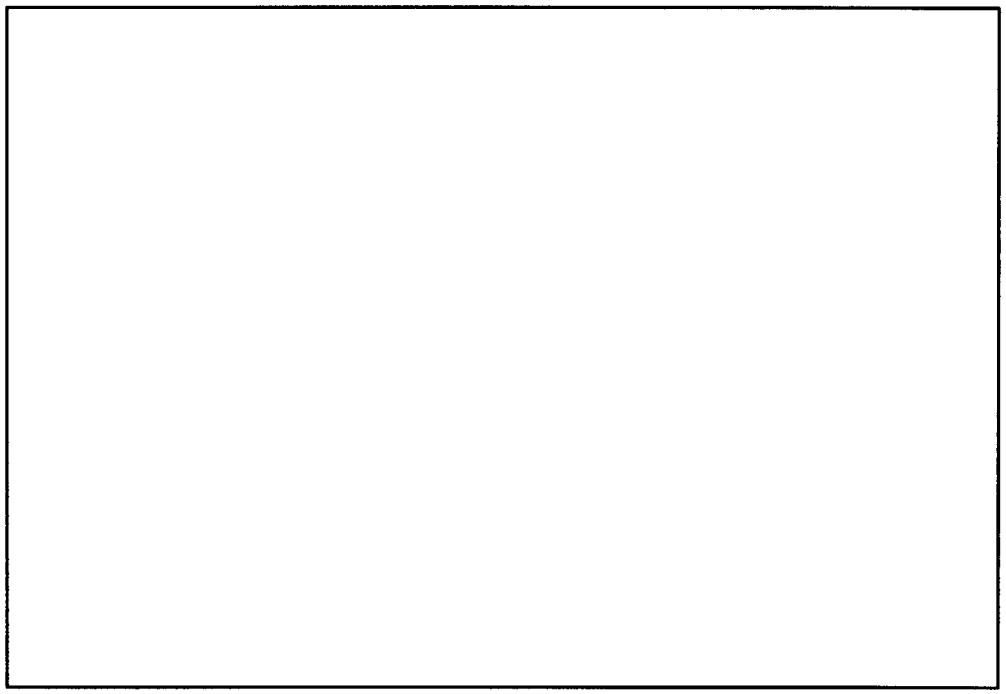
FIG. 8A shows a uniform white pattern image and FIG. 8B shows a pattern image for position calibration.

When the pointed position detection section 74 determines the projection frame of the projector, the projector 20 projects the white pattern image of FIG. 8A onto the screen 10.

Figure 8B:
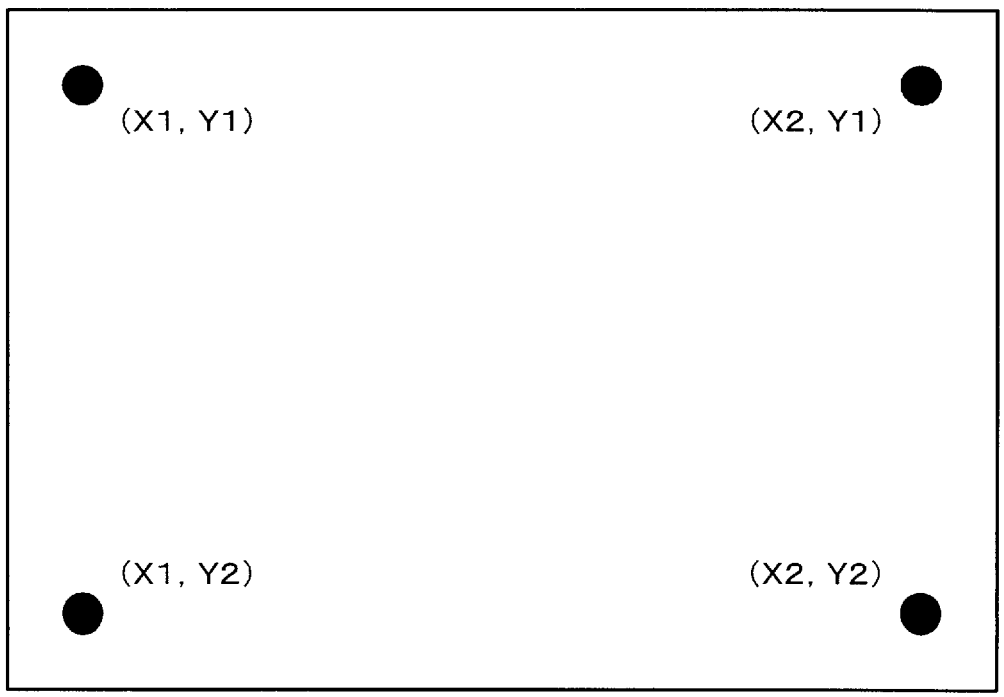

After this white pattern image has been displayed, an image having four black spots in the upper left, upper right, lower right, and lower left corners of the image display region 12 is displayed, as shown in FIG. 8B. These black spots are positioned at substantially uniform distances from the central position of the image display region 12. The four black spots are expressed as coordinates (X1, Y1), (X2, Y1), (X1, Y2), and (X2, Y2) on the image display region 12.

The CCD camera 40 obtains the coordinates of the four black spots on the image processing region by forming an image of these four black spots on the screen 10. It is possible to convert any desired coordinates on the image processing region into coordinates on the image display region 12, by correlating the coordinates on the image processing region that are obtained by this imaging against the above-described coordinates on the image display region 12.

The description now turns to the processing involved with the above described position detection, using flowcharts for reference.

Flow of Processing

Figure 9:
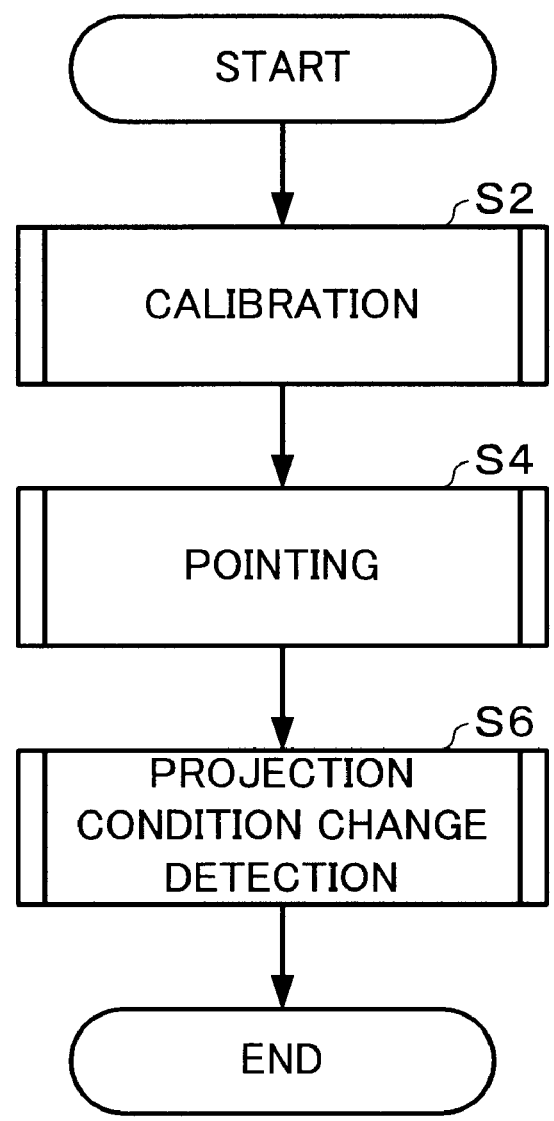
FIG. 9 is a flowchart of pointed position detection processing in accordance with this embodiment of the present invention.

A flowchart of the pointed position detection processing in accordance with this embodiment of the present invention is shown in FIG. 9.

First of all, the system performs calibration (step S2) to obtain correspondence between the coordinates of the display image and a processing image, and also to acquire an image for differential image generation as a reference image.

During pointing (step S4), the system obtains a pointing image, creates the differential image 330, and detects the pointed position 310.

During the detection of changes in projection conditions (step 6), the image for differential image generation is captured once again if necessitated by changes in the environment. The new image for differential image generation is substituted instead of the original image for differential image generation, and the differential image 330 is created from the new the image for differential image generation and the pointing image.

Details of these three steps are given below.

Figure 10:
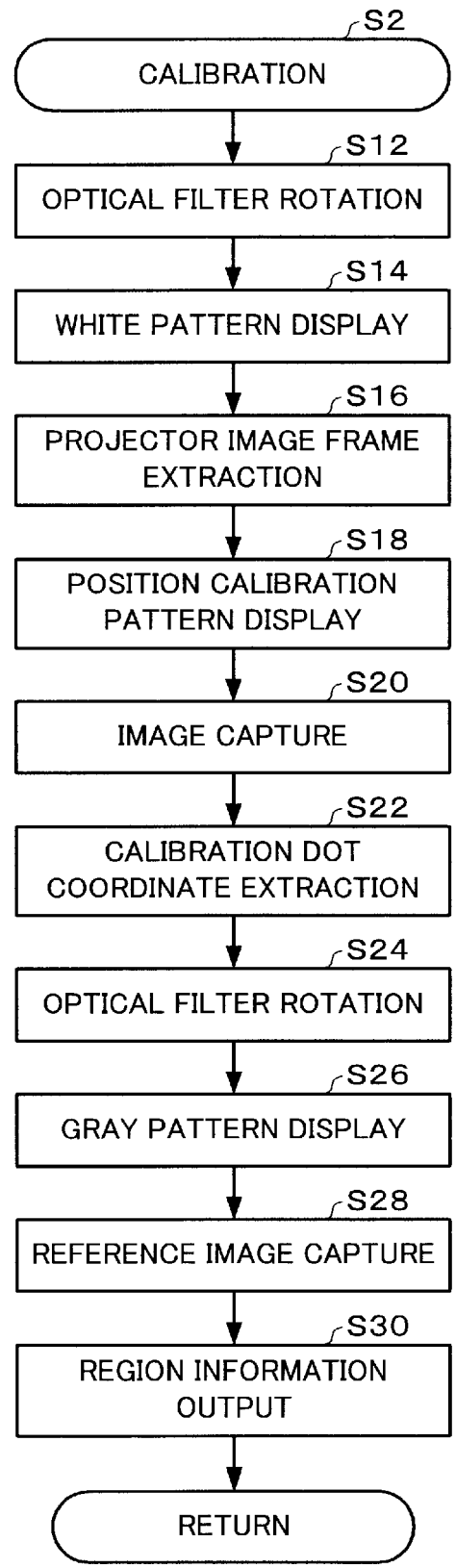
FIG. 10 is a flowchart of a calibration subroutine in accordance with this embodiment of the present invention.

A flowchart of a calibration subroutine in accordance with an example of this embodiment of the present invention is shown in FIG. 10.

First of all, the presenter uses an operating section 50, shown in FIG. 5, to issue a pointing instruction to the control section 66. This causes the control section 66 to output a control instruction to the image capture section 72. When that control instruction is transferred by the image capture section 72 to the drive device 18, the drive device 18 causes the optical filter 17 to rotate so that the optical filter 17b is positioned in front of the lens 41 (step S12). In other words, the CCD camera 40 images the image display region 12 within the visible region, in that state.

The image generation section 63 creates a uniform white-colored image pattern as shown in FIG. 8A. The projector 20 projects that white-colored image.

The CCD camera 40 forms an image of the image display region 12. The processing section 70 for position detection extracts a frame of the image projected by the projector (step S16).

This embodiment of the present invention makes it possible to extract the frame of the image projected by the projector accurately, by displaying the uniform white-colored image pattern.

The image generation section 63 of FIG. 5 then creates the pattern image for position calibration shown in FIG. 8B. The projector 20 projects that image for position calibration (step S18).

The CCD camera 40 forms an image of the image display region 12. The image capture section 72 captures that image (step S20).

The pointed position detection section 74 detects the coordinates of the four black spots of FIG. 8B, based on the captured image (step S22). This establishes the correspondence between the coordinates on the image display region 12 and the coordinates on the image processing region, so that the system can perform suitable control such as that of the cursor, based on this position detection.

The drive device 18 then rotates the optical filter 17 so that the optical filter 17a is positioned in front of the lens 41 (step S24). In other words, the CCD camera 40 thereafter takes an image of the image display region 12 that is formed by infrared rays.

In this manner, the system can extract a differential image accurately and without being hampered by the projection light, by taking an image of the image display region 12 that is formed by infrared rays.

In this state, the image generation section 63 creates a uniform gray image and the projector 20 projects that uniform gray image towards the image display region 12 (step S26).

Still in this state, the CCD camera 40 forms an image of that uniform gray image. The image capture section 72 captures the image for differential image generation that is the reference image (step S28). This image for differential image generation is stored in the memory 80 which is a storage portion.

It is therefore possible to detect the position of a "pointer object", even when the pointer object is not moving, by using an image that is formed from a uniform image as an image for differential image generation, and creating a differential image from that image for differential image generation and "an image including the pointer object (pointing image)".

In other words, provided there is a uniform image, it is possible to use it as an image for differential image generation that is used for detecting the pointed position of the pointer object, even if there is no gray image.

It should be noted, however, that if the color of the uniform image is gray, the difference between the brightness of the image for differential image generation and the brightness of "portions other than the pointer object" is reduced. This makes it possible to create a more suitable differential image for position detection.

The pointed position detection section 74 outputs to the control section 66 region information that comprises coordinate information for calibration dots within the projection region of the projector within the image formed by the CCD camera 40 that is obtained during calibration (step S30).

The description now turns to the pointing processing (step S4).

Figure 11:
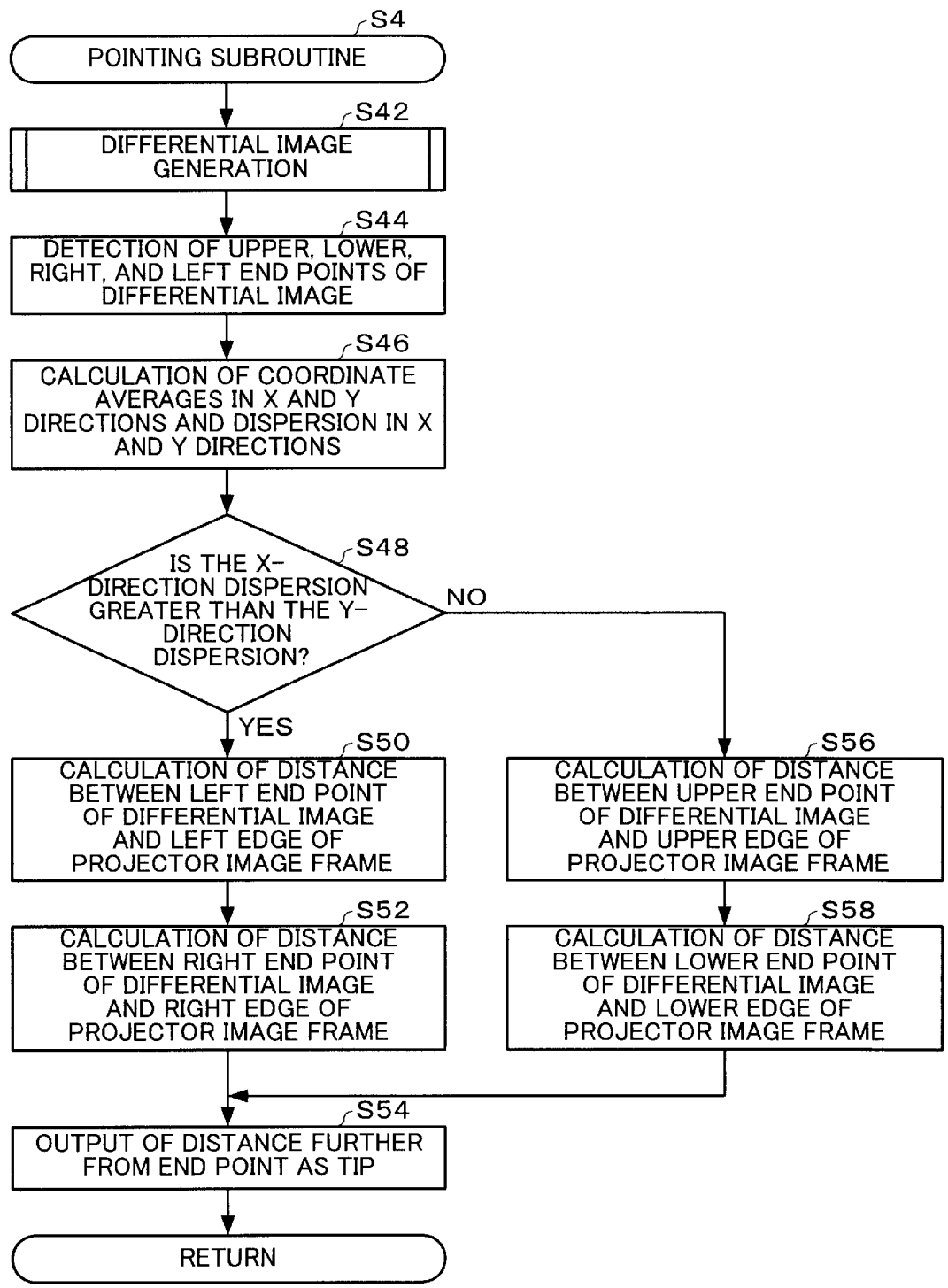
FIG. 11 is a flowchart of a pointing subroutine in accordance with this embodiment of the present invention.

A flowchart of the pointing subroutine in accordance with an example of this embodiment of the present invention is shown in FIG. 11.

Figure 12:
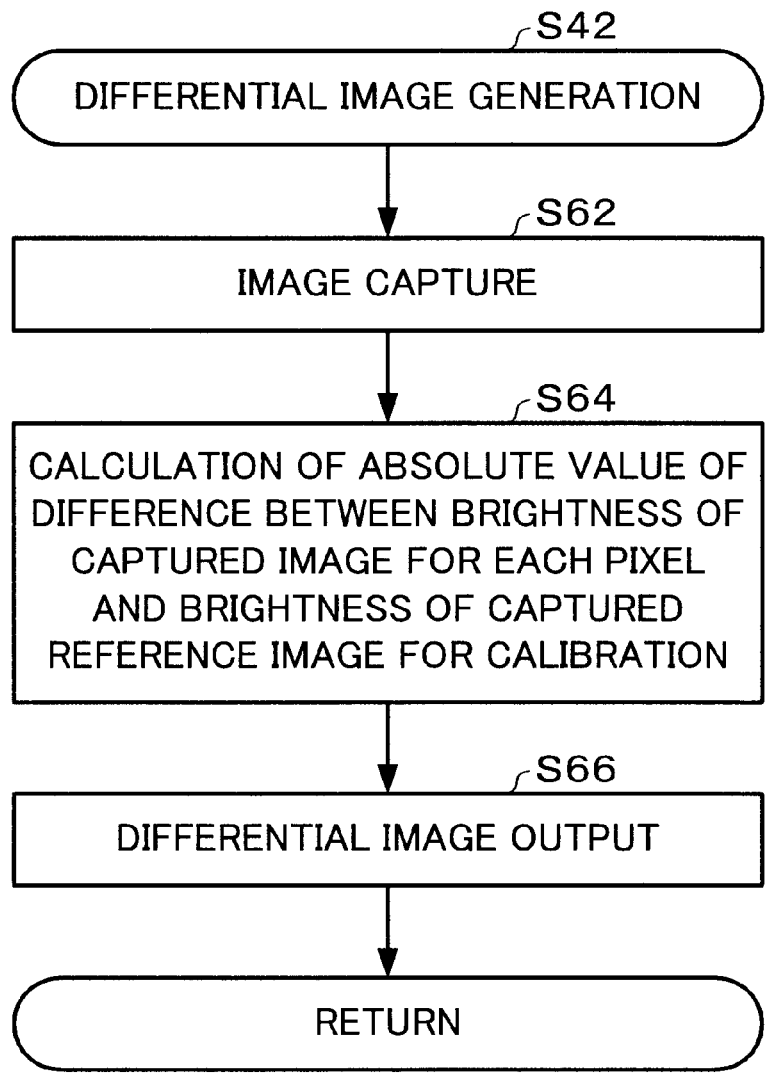
FIG. 12 is a flowchart of a differential image generation subroutine in accordance with this embodiment of the present invention.

First of all, a differential image is created (step S42) A flowchart of the differential image generation subroutine in accordance with an example of this embodiment of the present invention is shown in FIG. 12.

To create the differential image, the CCD camera 40 forms an image of the image display region 12 in a state in which the image display region 12 is being indicated by the pointer rod 32. The image capture section 72 captures a pointing image as a second pointing image (step S62).

The difference extraction section 82 calculates an absolute value of the difference between the brightness of the pointing image (captured image) and the brightness of the image for differential image generation (the captured reference image for calibration) stored in the memory 80, for each pixel (step S64).

The data extraction processing section 84 then outputs the differential image (step S66). The differential image is created as described above.

The description now returns to FIG. 11.

After the creation of the differential image, the pointed position detection section 74 detects each of upper, lower, right, and left end points of the differential image (step S44).

The pointed position detection section 74 then calculates averages of the coordinates of the differential image in the X and Y directions and the pixel dispersion (step S46). A general formula can be applied for calculating the dispersion.

If the dispersion in the X direction is greater than that in the Y direction (step S48), the pointed position detection section 74 calculates a distance A between the left end point of the differential image and the left edge of the frame of the image projected by the projector (step S50) and a distance B between the right end point of the differential image and the right edge of the frame of the image projected by the projector (step S52).

The pointed position detection section 74 then compares the distance A and the distance B and outputs the distance that is further from the corresponding end point as the tip (step S54).

In a similar manner, if the dispersion in the X direction is less than or equal to that in the Y direction (step S48), the pointed position detection section 74 calculates a distance C between the upper end point of the differential image and the upper edge of the frame of the image projected by the projector (step S56) and a distance D between the lower end point of the differential image and the lower edge of the frame of the image projected by the projector (step S58).

The pointed position detection section 74 then compares the distance C and the distance D and outputs the distance that is further from the corresponding end point as the tip (step S54).

In other words, the indication of the pointer rod 32 is derived as distances from the four directions, on the premise that the image display region 12 has four corners. The processing from step S44 to step S54 makes it possible to identify which direction the pointer is coming from, thus making it possible to identify the tip of the pointer regardless of the direction it is coming from.

The above described processing makes it possible to detect the pointed position 310. If, however, a disturbance such as sunlight should intrude during the presentation, it could happen that noise will be comprised within the formed image.

Projection condition change detection processing is performed to ensure that the pointed position 310 can be detected accurately in such a case (step S6).

Figure 13:
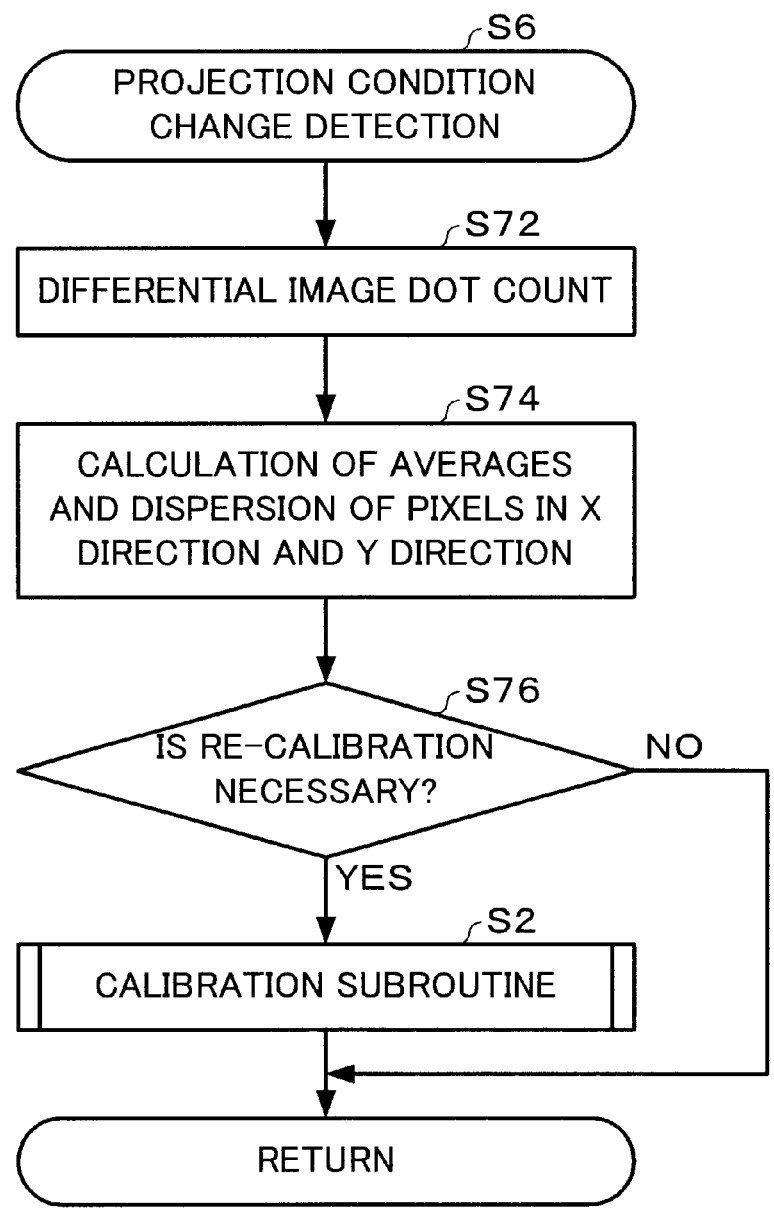
FIG. 13 is a flowchart of a projection condition change detection subroutine in accordance with this embodiment of the present invention.

A flowchart of the projection condition change detection subroutine in accordance with this embodiment of the invention is shown in FIG. 13.

First of all, the pointed position detection section 74 counts the dots of the differential image (step S72), then calculates the averages and dispersion of pixels in the X direction and the Y direction (step S74).

Note that in practice these processes (steps S72 and S74) are performed by step S46.

The pointed position detection section 74 then determines whether or not recalibration is necessary (step S76). more specifically, the pointed position detection section 74 determines that there is a lot of noise if the value of the dispersion is greater than a predetermined value, and obtains a reference image that is part of the above described calibration processing (steps S26 to S30).

This ensures that the differential image can be extracted in a manner suitable for the current conditions, even if the projection conditions should change due to a cause such as sunlight entering into the presentation. Note that since the uniform image is displayed for only an instant, the calibration can be performed without the audience becoming aware of it.

This re-capture of the image for differential image generation could be done at a predetermined temporal spacing.

Since the image for differential image generation can be refreshed regularly in this manner, a differential image can always be created in accordance with the current environmental conditions. This is particularly effective in cases where changes in external lighting are extreme.

The description now turns to the hardware configuration of the processing section 60.

Figure 14:
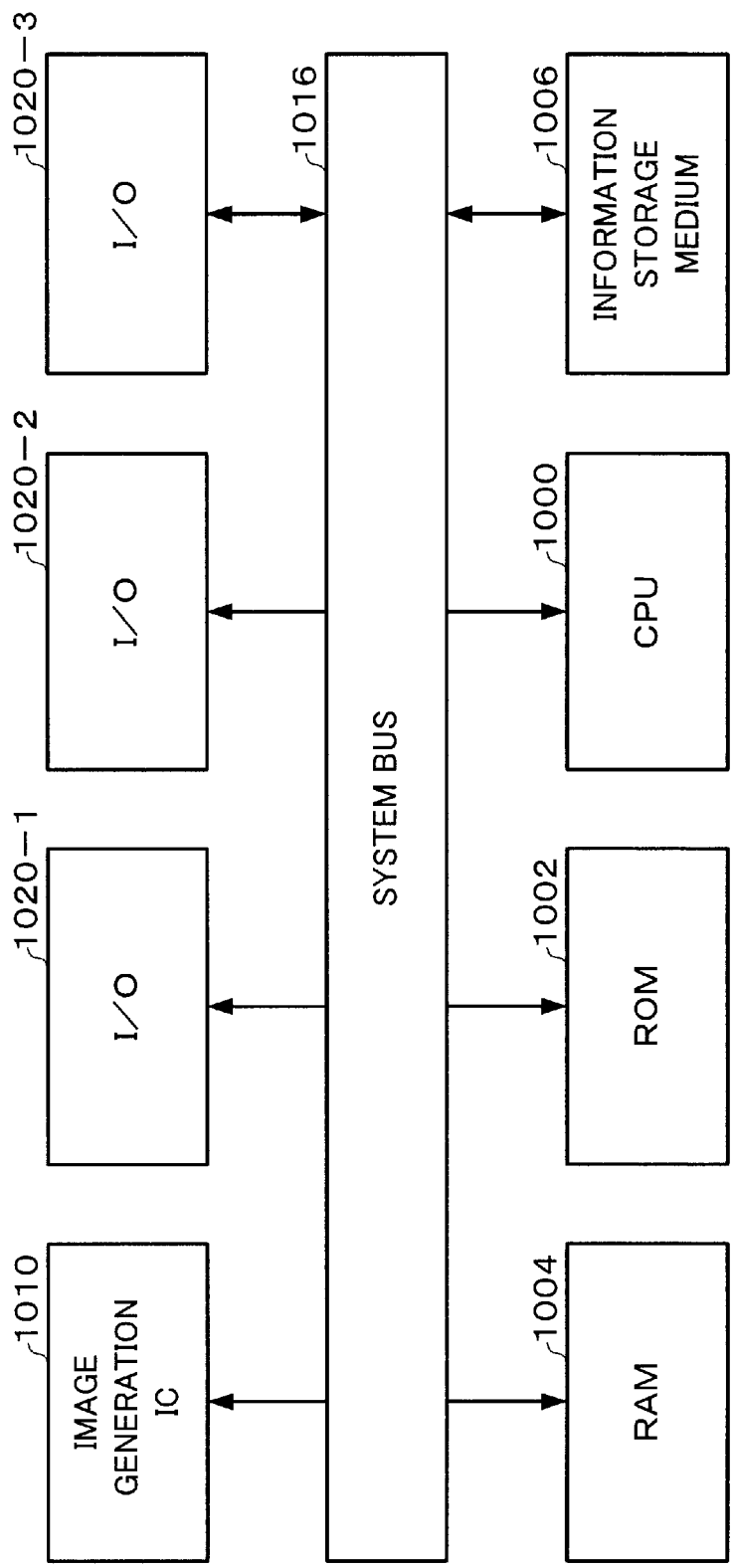
FIG. 14 is illustrative of the hardware configuration of the processing section in accordance with this embodiment of the present invention.

The hardware of the processing section 60 in accordance with an example of this embodiment of the invention is shown in FIG. 14.

In the device shown in FIG. 14, a CPU 1000, ROM 1002, RAM 1004, an information storage medium 1006, an image generation IC 1010, and input-output (I/O) ports 1020-1, 1020-2, and 1020-3 are connected together by a system bus 1016 in such a manner that data can be mutually transferred therebetween. Components such as the CCD camera 40, the projector 20, and the operating section 50 are connected to the I/O ports 1020-1, 1020-2, and 1020-3.

The information storage medium 1006 is used for storing a program and image data. Various means could be used as the information storage medium 1006, such as a CD-ROM, DVD-ROM, ROM, RAM, or hard disk.

The CPU 1000 controls the entire device and performs various types of data processing, in accordance with a program stored in the information storage medium 1006 and a program stored in the RON 1002. The RAM 1004 is storage means that is used as a work area for the CPU 1000, and given contents for the information storage medium 1006 and the ROM 1002, as well as calculation results for the CPU 1000, are contained therein. A data structure having the logical configuration for implementing this embodiment of the present invention is constructed within the ROM 1002 or the information storage medium 1006.

The various processes described with reference to FIGS. 1 to 13 are implemented by the information storage medium 1006 that contains programs for performing those processes, together with components such as the CPU 1000 and the image generation IC 1010 that operate in accordance with those programs. Note that the processing performed by the image generation IC 1010 and other components could be implemented by hardware, or they could be implemented by the operations of programs used by the CPU 1000 or an ordinary DSP, in other words, in a software Manner.

It is also possible to implement the function of a processing section 110 by downloading programs through a network from a host machine, instead of the information storage medium 1006. In other words, this system could be implemented by a program for a computer or by carrier waves.

The present invention has been described above with reference to a preferred embodiment thereof, but the embodiments of the present invention are not limited thereto.

For example, the CCD camera 40, the optical filter 17, the drive device 18, and the processing section 60 could be integrated with the projector 20.

The data processing after the detection of the pointed position 310 is also not limited to the calculation of the display position of the cursor; it could also be changes in the display of the cursor, icon pointing determination, or icon display modification, by way of example.

In addition to the method of rotating the optical filter 17, methods could be used such a method of employing an infrared shutter that selectively passed infrared light and visible light according to its setting, or a method of manually covering the CCD camera 40 with an infrared filter to take an image.

The present invention can also be applied to presentations and other performances that display an image by display means other than a projector means such as a projector. Such a display means corresponds to a wide range of display devices other than a liquid-crystal projector device, such as a cathode ray tube (CRT), a plasma display panel (PDP), a field emission display (FED), an electro-luminescence (EL) device, a direct-view type of liquid-crystal display device, or a digital micromirror device (DMD). Note that DMD is a trademark owned by Texas Instruments Incorporated.

In addition, although the embodiment of the present invention was described above as being applied to a front-projection type of projector, it can equally well be applied to a rear-projection type of projector.

What is claimed is:

1. A pointed position detection system which detects a position pointed by a pointer within a predetermined image display region, the system comprising:

image pick-up means for picking up an image of the image display region;

means for storing an image for differential image generation which is generated by picking up an image of the image display region on which a uniform image is displayed;

differential image extraction means for extracting a differential image based on the image for differential image generation and a pointing image which is generated by picking up an image of the image display region in which a pointing action is performed based on a cast shadow; and means for detecting a pointed position in the pointing image based on the extracted differential image, wherein the means for detecting the pointed position detects change of environment effect on the image display region even when the pointing action is in a halted state, and substitutes a new image for differential image generation in place of the image for differential image generation when the detected change based on a calculated dispersion of pixels is equal to or greater than a predetermined amount.

2. The pointed position detection system as defined in claim 1, wherein the image for differential image generation and the pointing image are generated by picking up an image formed by invisible rays.

3. The pointed position detection system as defined in claim 2, wherein the invisible rays are infrared rays; and wherein the image pick-up means picks up an image formed by infrared rays, through an infrared transmission section that allows only infrared rays to pass.

4. The pointed position detection system as defined in claim 3, further comprising:

an auxiliary light source which projects infrared rays toward the image display region when picking up an image formed by infrared rays.

5. The pointed position detection system as defined in claim 1, further comprising:

display means for displaying an image in the image display region; and control means for:

determining whether or not update of the image for differential image generation is necessary, based on the differential image which has been extracted based on the image for differential image generation and a non-pointing image generated by picking up an image of the image display region in which no pointing action is performed; and controlling the display means to display the uniform image for a predetermined short period of time and also controlling the image pick-up means to pick up an image of the image display region in which the uniform image is displayed and thus capture a new image for differential image generation, when the update is necessary.

6. The pointed position detection system as defined in claim 1, further comprising:

display means for displaying an image within the image display region; and control means for controlling the display means to display the uniform image for a predetermined short period of time at a predetermined temporal spacing, and also controlling the image pick-up means to pick up an image of the image display region in which the uniform image is displayed and thus capture a new image for differential image generation.

7. The pointed position detection system as defined in claim 5, wherein the control means controls the display means to display a predetermined image for calibration during a calibration step, to obtain correspondence between the image display region and an image processing region.

8. A pointed position detection system which detects a position pointed by a pointer within a predetermined image display region, the system comprising:

image pick-up section for picking up an image of the image display region;

section for storing an image for differential image generation which is generated by picking up an image of the image display region on which a uniform image is displayed;

differential image extraction section for extracting a differential image based on the image for differential image generation and a pointing image which is generated by picking up an image of the image display region in which a pointing action is performed based on a cast shadow; and section for detecting a pointed position in the pointing image based on the extracted differential image, wherein the means for detecting the pointed position detects change of environment effect on the image display region even when the pointing action is in a halted state, and substitutes a new image for differential image generation in place of the image for differential image generation when the detected change based on a calculated dispersion of pixels is equal to or greater than a predetermined amount.

9. A system comprising processing means that performs predetermined data processing which reflects a pointed position detected by the pointed position detection system as defined in claim 1.

10. A system as defined in claim 9, wherein the processing means performs positional control of a cursor comprised within a display image, based on the detected pointed position.

11. A computer-usable program embodied on an information storage medium or in a carrier wave for implementing a system that detects a pointed position in a predetermined image display region, the program implementing in a computer:

means for storing an image for differential image generation which is generated by picking up an image of the image display region on which is displayed a uniform image by means of image pick-up means;

differential image extraction means for extracting a differential image based on the image for differential image generation and a pointing image which is generated by picking up an image of the image display region in which a pointing action is performed based on a cast shadow; and means for detecting a pointed position in the pointing image, based on the extracted differential image, wherein the means for detecting the pointed position detects change of environment effect on the image display region even when the pointing action is in a halted state, and substitutes a new image for differential image generation in place of the image for differential image generation when the detected change based on a calculated dispersion of pixels is equal to or greater than a predetermined amount.

12. The program as defined in claim 11, wherein the image for differential image generation and the pointing image are generated by picking up an image formed by invisible rays.

13. The program as defined in claim 11, further implementing in a computer, control means for:

determining whether or not update of the image for differential image generation is necessary, based on the differential image which has been extracted based on the image for differential image generation and a non-pointing image generated by picking up an image of the image display region in which no pointing action is performed; and controlling display means which displays an image in the image display region to display the uniform image for a predetermined short period of time and also controlling the image pick-up means to pick up an image of the image display region in which the uniform image is displayed and thus capture a new image for differential image generation, when the update is necessary.

14. The program as defined in claim 11, further implementing in a computer, control means for controlling display means which displays an image in the image display region to display the uniform image for a predetermined short period of time at a predetermined temporal spacing, and also controlling the image pick-up means to pick up an image of the image display region in which the uniform image is displayed and thus capture a new image for differential image generation.

15. The program as defined in claim 13, wherein the control means controls the display means to display a predetermined image for calibration during a calibration step, to obtain correspondence between the image display region and an image processing region.

16. A program which implements in a computer, processing means that performs predetermined data processing which reflects a pointed position detected by using the means as defined in claim 11.

17. The program as defined in claim 16, wherein the processing means performs positional control of a cursor comprised within a display image, based on the detected pointed position.

18. A pointed position detection method of detecting a position pointed in a predetermined image display region, the method comprising the steps of:

storing an image for differential image generation which is generated by picking up an image of the image display region on which is displayed a uniform image;

extracting a differential image based on the image for differential image generation and a pointing image which is generated by picking up an image of the image display region in which a pointing action is performed based on a cast shadow;

detecting a pointed position in the pointing image, based on the extracted differential image; and detecting change of environment effect on the image display region even when the pointing action is in a halted state, and substituting a new image for differential image generation in place of the image for differential image generation when the detected change based on a calculated dispersion of pixels is equal to or greater than a predetermined amount.

19. The pointed position detection method as defined in claim 18, wherein the image for differential image generation and the pointing image are generated by picking up an image formed by invisible rays.

20. The pointed position detection method as defined in claim 18, wherein the step of extracting a differential image includes:

a step of extracting a differential image based on the image for differential image generation and a non-pointing image generated by picking up an image of the image display region in which no pointing action is performed;

a step of determining whether or not update of the image for differential image generation is necessary based on the extracted differential image;

a step of displaying the uniform image for a predetermined short period of time when the update is necessary; and a step of picking up an image of the image display region in which the uniform image is displayed to capture a new image for differential image generation.

21. The pointed position detection method as defined in claim 18, further comprising:

a step of displaying the uniform image for a predetermined short period of time at a predetermined temporal spacing; and a step of picking up an image of the image display region in which the uniform image is displayed to capture a new image for differential image generation.

22. A projector comprising the pointed position detection system as defined in claim 8.

* * * * *